US005253821A

United States Patent [19]

Johnson

[11] Patent Number: 5,253,821

[45] Date of Patent: Oct. 19, 1993

[54] SECURITY MAGNETIC TAPE CARTRIDGE FOR USE IN ELECTRONIC ARTICLE SURVEILLANCE SYSTEMS

[75] Inventor: Michael W. Johnson, Cottage Grove, Minn.

[73] Assignee: Minnesota Mining and Manufacturing Company, St. Paul, Minn.

[21] Appl. No.: 844,136

[22] Filed: Mar. 2, 1992

[51] Int. Cl.[5] .......................... G11B 23/07; G08B 13/14

[52] U.S. Cl. .......................... 242/197; 340/572

[58] Field of Search .......... 242/197, 198, 195, 196, 242/199, 200; 340/568, 572, 551

[56] References Cited

U.S. PATENT DOCUMENTS 4,710,754 12/1987 Montean .............................. 340/572
4,794,470 12/1988 Lauffenburger et al. .......... 340/572
4,967,185 10/1990 Montean .............................. 340/572
4,990,891 2/1991 Reeb .................................. 340/572
5,008,649 4/1991 Klein ................................. 340/572

*Primary Examiner*—William A. Cuchlinski, Jr.
*Assistant Examiner*—William C. Dowling
*Attorney, Agent, or Firm*—Gary L. Griswold; Walter N. Kirn; William B. Barte

[57] ABSTRACT

A security cartridge for magnetic tape recording media especially adapted for use with an electronic article surveillance system. The security cartridge includes a cartridge casing defining an internal, tape receiving chamber, a reel of magnetic tape windably carried within the chamber and a pair of orthogonally oriented magnetic markers carried within the internal chamber by a marker carrier bracket. The carrier bracket includes a pair of bracket leaves that present first and second generally orthogonally oriented, generally planar marker mounting surfaces, and engagement margins for operably, abutably engaging the internal structure of the cartridge chamber to position the carrier bracket within the chamber.

8 Claims, 1 Drawing Sheet

SECURITY MAGNETIC TAPE CARTRIDGE FOR USE IN ELECTRONIC ARTICLE SURVEILLANCE SYSTEMS

FIELD OF THE INVENTION

This invention relates in general to cartridges for magnetic tape. In particular, it relates to single reel magnetic tape cartridges especially adapted for use with an electronic article surveillance system.

BACKGROUND OF THE INVENTION

Single reel cartridges for magnetic tape are well known. For instance, one type of single reel cartridge used with magnetic tape is disclosed in U.S. Pat. Nos. 4,775,115; 4,452,406; 4,426,047; and 4,383,660. Such single reel cartridges provide a number of advantages over more conventional, large tape spool reels. Data is more compactly stored on single reel cartridges than on spool reels, providing for faster data retrieval times and reduced physical storage space requirements. In addition, single reel cartridges are easily manipulated by automated handling equipment, facilitating the automated retrieval of the cartridges from storage racks, and the automated insertion and removal of retrieved cartridges from cartridge data reading devices.

Unfortunately, the very characteristics of single reel magnetic tape cartridges that provide for the above noted benefits present physical security issues that have heretofore not been successfully addressed. In particular, single reel tape cartridges are by design compact, and can easily be placed into a brief case, purse, or pocket, and transported undetected out of designated storage areas. The security problem is exacerbated by the large amount of data that can be stored on an individual single reel cartridge.

Data banks made up of single reel magnetic tape cartridges can typically include sensitive financial information, confidential personnel data, proprietary engineering data and similar types of controlled information. On line access to such information is controlled through the use of computer pass words and other information handling techniques. Maintaining physical security of information media such as single reel magnetic tape cartridges, however, is equally important, and can be accomplished only through storing the cartridges in a controlled access work space and providing continuous monitoring of the cartridges.

Electronic article surveillance systems for monitoring the egress of sensitive objects from controlled spaces are well known. For instance, markers formed from a piece of high permeability magnetic material can be placed within the binding of a library book. Spaced apart detection panels are then placed across the access points to and from the library. The panels include field coils and detector coils for producing a magnetic field across the access point for detecting the passage of a marker between the panels. If a person attempts to carry a book through the magnetic field presented by the panels, without first desensitizing the marker within the book binding or the magnetic field, the presence of the marker will be detected and an alarm initiated.

Heretofore, electronic material surveillance systems have only enjoyed limited acceptance in monitoring single reel tape cartridges within controlled work spaces. While markers used in such systems can be applied to the external surfaces of conventional single reel magnetic tape cartridges, markers carried by conventional cartridges can be easily removed or otherwise tampered with. Moreover, markers carried on the external surfaces of a conventional cartridge can interfere with the handling of the cartridge by automated cartridge handling equipment.

Most often, single reel magnetic tape cartridges have sealed, internal tape carrying compartments that cannot be ordinarily accessed without disassembling or destroying the cartridge. Accordingly, a single reel magnetic tape cartridge especially designed for the placement of electronic article surveillance markers within the cartridge would provide for the successful employment of an electronic article surveillance system in monitoring the physical security of the cartridges.

SUMMARY OF THE INVENTION

The security cartridge in accordance with the present invention is especially adapted for use with an electronic article surveillance system to monitor the physical security of the cartridge. The security cartridge hereof includes a cartridge casing defining an internal, tape receiving chamber, a reel of magnetic tape windably carried within the chamber and a pair of orthogonally oriented magnetic markers carried within the internal chamber by a marker carrier bracket. The carrier bracket includes a pair of bracket leaves that present first and second generally orthogonally oriented generally planar marker mounting surfaces, and engagement margins for operably, abutably engaging the internal structure of the cartridge chamber to position the carrier bracket within the chamber.

The security cartridges hereof are designed to be stored in an access controlled work space, with entrance and egress to and from the space directed only through a magnetic field established by the panels of an electronic article surveillance system. Passage of a security cartridge through the panels will initiate an alarm. The magnetic markers of the security cartridges are essentially tamper proof, since the internal chamber of the cartridges is accessible only upon disassembly or destruction of the cartridge.

DETAILED DESCRIPTION OF THE INVENTION

Figure 1:
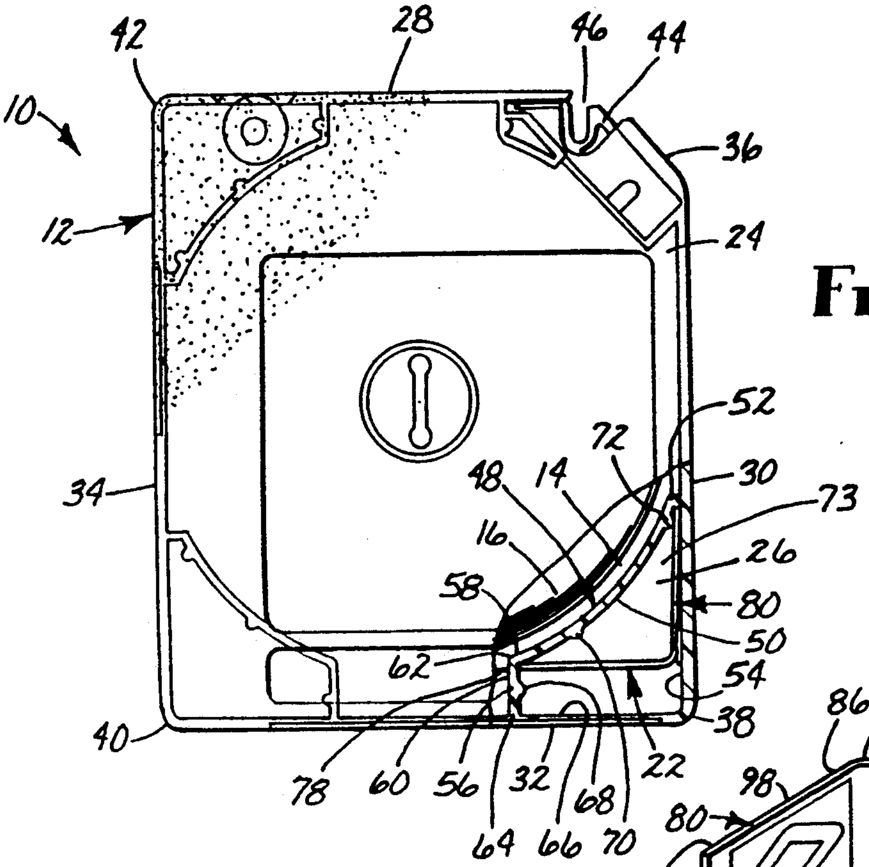
FIG. 1 is a top elevational view of a single reel magnetic tape security cartridge in accordance with the present invention, with parts broken away for clarity.

FIG. 1 of the drawing shows a 3480 type computer tape cartridge 10 for computer recording media. In accordance with the present invention, thus making it a security cartridge, the cartridge broadly includes a cartridge case 12 presenting an internal cartridge case chamber 14, a reel of magnetic tape 16 windably carried within the chamber 14 and a pair of orthogonally oriented magnetic markers 18, 20 carried by a marker carrier bracket 22. The magnetic tape 16 stored within the cartridge 10 can be windably removed from the internal cartridge case chamber 14 upon insertion of the cartridge into a tape read/write unit (not shown) for magnetically reading or writing electronic data from or to the tape.

Cartridge case 12 broadly includes cartridge top wall 24, an opposed cartridge bottom wall 26, and cartridge side walls 28, 30, 32, 34 extending between the top wall 24 and bottom wall 26 (not shown). The cartridge top and bottom walls 24, 26 are generally rectangular in shape except at one corner 36 of the case 12 that is angled at approximately 45 degrees relative to side walls 28, 30. With the exception of corner 36, adjacent ones of side walls 28, 30, 32, 34 are oriented generally at right angles to each other to present squared cartridge corners 38, 40, 42. A leader block 44 fixedly attached to the terminal end of tape 16 is snapably, removably received within a cartridge opening 46 at the cartridge corner 36.

The cartridge case chamber 14 defined by cartridge top wall 24, bottom wall 26, and side walls 28, 30, 32, 34 is a generally sealed compartment accessible only through opening 46. The upper and lower halves of the cartridge are preferably constructed of a synthetic resin and are heat fused or sonically fused together during the manufacturing process. Alternatively, the two halves of the cartridge 10 can be secured together with screws or other fasteners. It will be apparent, however, that the structure carried within the internal chamber 14 is inaccessible to human tampering without disassembly or even destruction of the cartridge 10.

The internal structure of the cartridge 10 includes a support panel 48 at corner 38 extending between the cartridge top wall 24 and bottom wall 26. Similar support panels (not shown) are positioned at corners 40, 42. Support panel 48 includes generally arcuate wall 50, having a first edge 52 integrally formed with the internal face 54 of side wall 30, and generally planar extension wall 56. Arcuate wall second edge 58 and extension wall first edge 60 are joined together along support panel corner 62. The extension wall second edge 64 is integrally formed with the internal face 66 of side wall 32. Strength ribs 68, 70, 72 are integrally molded with the support panel 48 and extend between the cartridge top wall 24 and bottom wall 26. The support panel 48 and side walls 30, 32 define a corner compartment 73 within the cartridge internal chamber 14.

Cartridge side wall 32 includes an upper panel 74 oriented generally perpendicular to cartridge top wall 24 and a lower, beveled panel 76. Beveled panel 76 and cartridge bottom wall 26 intersect along margin 78. Referring to FIG. 1, extension wall 56 of support panel 48 extends between the upper panel 74 of side wall 32 and the margin 78.

Figure 2:
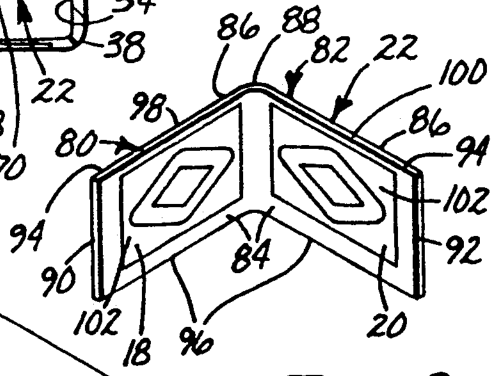
FIG. 2 is a perspective view of the carrier bracket of the security cartridge in accordance with the present invention, depicting a pair of magnetic markers orthogonally mounted on the carrier bracket.

Referring to FIG. 2, marker mounting carrier bracket 22 is an angled structure having first and second, generally planar bracket leaves 80, 82. Each bracket leaf 80, 82 includes an internal bracket face 84 and an opposed external face 86. The bracket leaves 80, 82 are oriented generally orthogonally with respect to each other, and are joined together along bracket corner margin 88. Bracket leaf side margins 90, 92 are oriented generally parallel to the bracket corner margin, extending between a respective leaf upper margin 94 and leaf lower margin 96. The bracket leaf upper and lower margins 94, 96 define generally L-shaped upper and lower bracket margins 98, 100. The bracket 22 may be inexpensively and simply made by thermally forming a rectangle of inexpensive thermoplastic material, such as polymethyl methacryate, into a right angle.

Markers 18, 20 comprise substantially planar, magnetically responsive markers suitable for use in magnetic electronic surveillance systems. The markers are preferably similar to the markers described in U.S. Pat. No. 4,710,754 and U.S. Pat. No. 4,967,185 assigned to the assignee of the present application, and may be preferably of a single status type. Single status markers are preferred, as opposed to dual status markers, because the security cartridge 10 of the present invention is expected to be primarily used in applications where removal of the cartridge 10 from a secured workplace is not allowed. It will be understood that single status markers maintain a uniform magnetic state, while dual status markers can be switched between two different magnetic states. Such markers are essentially responsive to interrogation fields applied along either orthogonal direction in the plane of the marker, and are not responsive to fields applied perpendicular to that plane. Accordingly, by providing two such markers, positioned at right angles with respect to each other, full three dimensional coverage is obtained, allowing a protected cartridge to be detected regardless of its orientation while passing through such systems.

The markers 18, 20 each present a generally planar front face 102 and an opposed rear face. An adhesive is carried by the marker rear faces for adhesive attachment of the markers 18, 20 to the carrier bracket leaf internal bracket faces 84.

In use, markers 18, 20 are adhesively carried on the leaf internal bracket faces 84 of carrier bracket 22, and the bracket 22 is carried within the corner compartment 73 of cartridge internal chamber 14. One bracket leaf 80 is positioned along side wall 30 with the external leaf face 84 aligned along the internal face of the side wall 30. The portion of bracket leaf 80 adjacent side margin 90 is carried between strength rib 72 and the side wall 30 in a force fit. Bracket leaf 92 extends along the margin 78 defined by the intersection of beveled panel 76 and bottom wall 26. Bracket side margin 92 abutably engages support panel 48 along support panel corner 62 and the generally L-shaped upper and lower bracket margins 98, 100 abutably engage the inner surfaces of the cartridge top and bottom walls 24, 26, thereby locking the bracket in a predetermined position within the chamber.

The markers 18, 20 will initiate an alarm when passed through the magnetic field established by the panels of an electronic article surveillance system. The orthogonal orientation of the two markers 18, 20 increases the probability of detection of the markers as they are passed through the field. The markers 18, 20 are not subject to removal or tampering because they are carried internally of the cartridge 10. The internal mounting of the markers 18, 20 and the carrier bracket 22 avoids any interference by the markers 18, 20 and bracket with automatic cartridge handling equipment.

Figure 3:
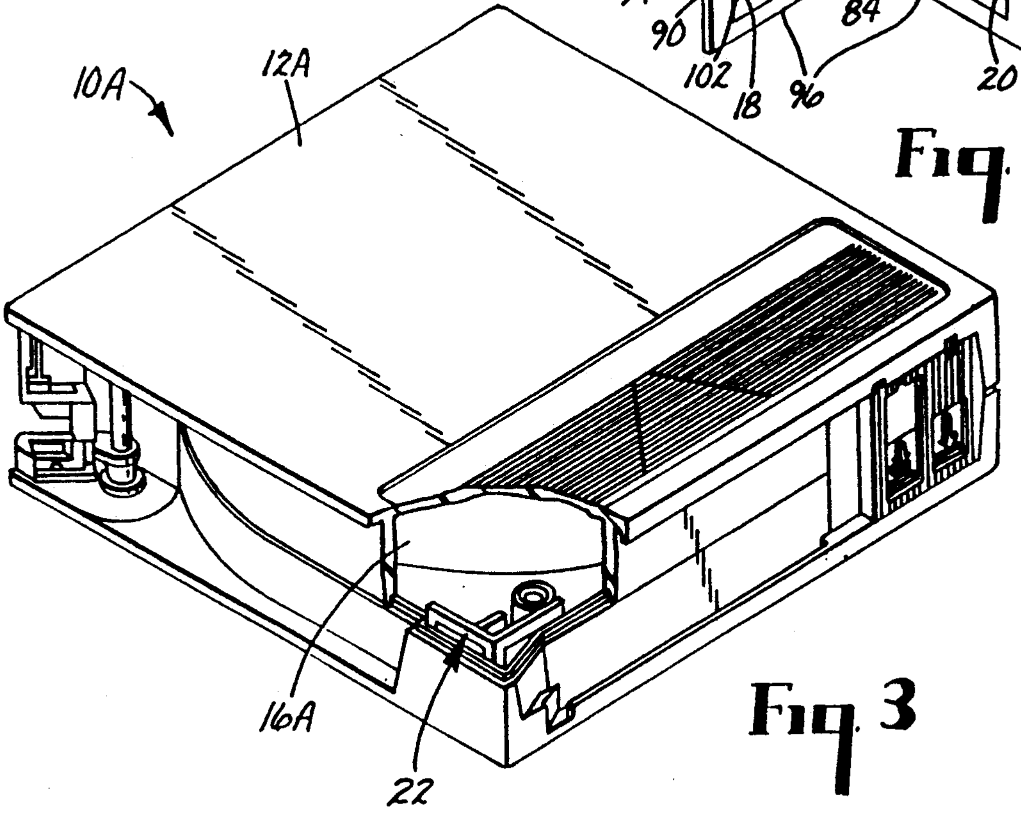
FIG. 3 is a perspective view of another embodiment of a security cartridge in accordance with the present invention with parts broken away for clarity.

In an alternative embodiment, a security cartridge 10A may alternatively be a CompacTape TM type computer tape cartridge such as developed by the Digital Equipment Corporation. Such a cartridge is significantly like that shown in FIG. 1, inasmuch as it contains a cartridge housing 12A, within which is positioned a single reel of computer tape 16A. As shown in the cutaway portion of FIG. 3, a marker carrier bracket 22 is positioned in one corner of the cartridge between appropriate internal ribs and the like so as to be rigidly positioned within the cartridge prior to assembly.

I claim:

1. A security cartridge for computer recording media adapted to have recorded thereon information of such sensitivity as to warrant institution of measures to prevent unauthorized removal of the cartridge from an access restricted work space, said cartridge being of the type containing a single reel of magnetic tape and having a cartridge top wall, an opposed cartridge bottom wall, and cartridge sidewalls extending between said top and bottom walls, said cartridge top, bottom and side walls defining a generally sealed chamber within which said reel is positioned, said cartridge further including an internal support structure and two magnetic markers adapted for use with an electronic article surveillance system, wherein each said marker presents a front face and an opposed rear face, and wherein the markers are affixed in a generally orthogonal manner to each other to carrier means received within said cartridge chamber, said carrier means including first and second generally orthogonally oriented generally planar marker mounting surfaces, and engagement margins for operably, abutably engaging said cartridge internal structure to thereby lock said carrier means within a predetermined position within said cartridge chamber.

2. The invention as claimed in claim 1, said top and bottom walls each presenting opposed internal and external faces, said carrier means engagement margins including opposed upper and lower margins for respectively, abutably engaging said top and bottom wall internal faces.

3. The invention as claimed in claim 2, said cartridge internal structure including abutable structure oriented between said top and bottom internal faces, said carrier means engagement margins including side margins extending generally between said upper and lower margins for abutably engaging said abutable structure.

4. The invention as claimed in claim 3, said carrier means comprising a mounting bracket having a generally planar first bracket leaf and a generally planar second bracket leaf oriented generally orthogonally to said first bracket leaf, each of said bracket leaves including an internal bracket face and an opposed, external face, said internal faces comprising said marker mounting surfaces.

5. The invention as claimed in claim 4, said first and second bracket leaves being integrally joined together to present a bracket corner margin, said bracket leaves each presenting an outer leaf margin oriented generally parallel to said corner margin, said outer leaf margins comprising said carrier means side margins.

6. The invention as claimed in claim 5, said bracket leaves each including an upper and lower leaf margin, said upper leaf margins intersecting at said bracket corner margin to present a generally L-shaped bracket upper margin, and said lower leaf margins intersecting at said bracket corner margin to present a generally L-shaped bracket lower margin, said upper and lower bracket margins comprising said carrier means upper and lower margins.

7. The invention as claimed in claim 1, wherein said markers are affixed to said marker mounting surfaces with adhesive means for adhering said marker rear faces to said marker mounting surfaces.

8. The invention as claimed in claim 1, said markers each comprise a substantially planar sheet of high permeability, low coercive force responder material.

* * * * *

UNITED STATES PATENT AND TRADEMARK OFFICE
CERTIFICATE OF CORRECTION

PATENT NO. : 5,253,821

DATED : October 19, 1993

INVENTOR(S) : Johnson

It is certified that error appears in the above-indentified patent and that said Letters Patent is hereby corrected as shown below:

Item [57], Title page, first column, under "U.S. PATENT DOCUMENTS", the following should also be cited:

| | | | |
|---|---|---|---|
| 4,383,660 | 5/1983 | Richard et al. . . . | 242/197 |
| 4,426,047 | 1/1984 | Richard et al. . . . | 242/197 |
| 4,452,406 | 6/1984 | Richard . . . . . | 242/195 |
| 4,775,115 | 10/1988 | Gelardi . . . . . | 242/195 |
| 5,081,446 | 1/1992 | Gill et al. . . . | 340/572 |

Signed and Sealed this

Twentieth Day of September, 1994

Attest:

BRUCE LEHMAN

Attesting Officer

Commissioner of Patents and Trademarks